(12) United States Patent
Garthe et al.

(10) Patent No.: US 10,400,480 B2
(45) Date of Patent: Sep. 3, 2019

(54) CABLE LOCKING SYSTEM

(71) Applicant: ABUS August Bremicker Sohne KG, Wetter-Volmarstein (DE)

(72) Inventors: Bernhard Garthe, Gevelsberg (DE); Bettina Riepe, Wuppertal (DE)

(73) Assignee: ABUS AUGUST BREMICKER SOHNE KG, Wetter-Volmarstein (DE)

( * ) Notice: Subject to any disclaimer, the term of this patent is extended or adjusted under 35 U.S.C. 154(b) by 471 days.

(21) Appl. No.: 14/700,871

(22) Filed: Apr. 30, 2015

(65) Prior Publication Data

US 2015/0361691 A1 Dec. 17, 2015

(30) Foreign Application Priority Data

May 5, 2014 (DE) .......................... 10 2014 106 225

(51) Int. Cl.
 *E05B 67/00* (2006.01)
 *F16B 2/10* (2006.01)
 (Continued)

(52) U.S. Cl.
 CPC .......... *E05B 67/003* (2013.01); *E05B 67/383* (2013.01); *F16B 2/10* (2013.01); *F16B 2/18* (2013.01); *Y10T 24/3953* (2015.01)

(58) Field of Classification Search
 CPC .. E05B 67/383; E05B 67/003; E05B 73/0005; B63B 21/08; F16G 11/101
 See application file for complete search history.

(56) References Cited

U.S. PATENT DOCUMENTS 3,667,259 A * 6/1972 Reque ................... E05B 67/383
                                                          292/288
5,167,135 A * 12/1992 Gobeski ................ E05B 67/383
                                                          16/260
(Continued)

FOREIGN PATENT DOCUMENTS

DE 93 08 696 U1 9/1993

OTHER PUBLICATIONS

Brady Kabelverriegelungssystem [Brady cable lockout device], p. 96 of the online catalogue taken from www.bradyeurope.com (Issue date of the pdf document: Jul. 25, 2008).
(Continued)

*Primary Examiner* — Mark A Williams
(74) *Attorney, Agent, or Firm* — Amster, Rothsten & Ebenstein LLP

(57) ABSTRACT

The present invention relates to a cable locking system which comprises a cable and a cable clamp having a first lever with a planar surface and having a second lever with a planar surface. The second lever is connected to the first lever in an articulated manner such that the two levers can be moved between a release position in which they are angled toward one another and a clamping position in which their planar surfaces contact one another and together define an opening for clamping the cable whose clear opening area decreases with an increasing approach to the clamping position. The first lever is interspersed in a locking region by a plurality of passage openings which are aligned with corresponding passage openings in the clamping position by which the second lever is interspersed in a locking region. The first lever furthermore has at least one angled section which rises from the planar surface such that it clampingly engages around a marginal section of the second lever in the clamping position and which is spaced apart from the joint at which the two levers are connected to one another by a
(Continued)

Figure 1:
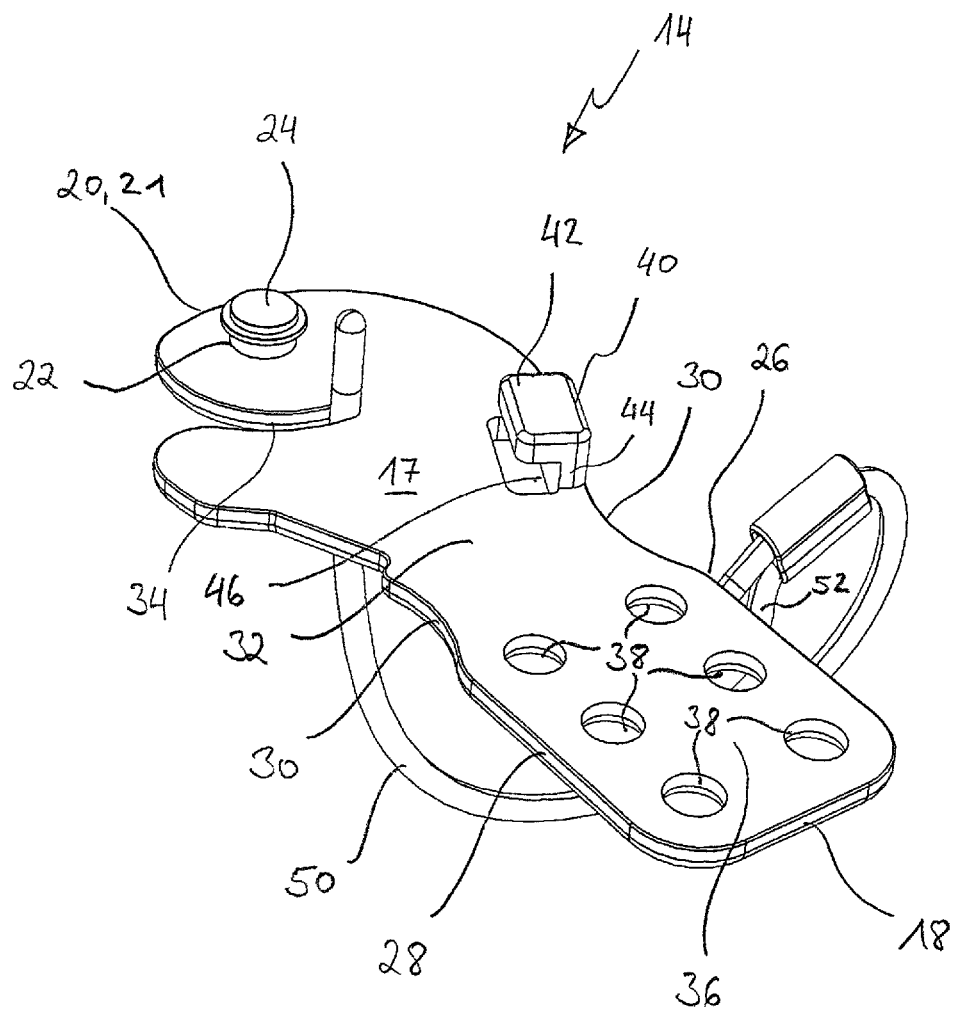

smaller amount than each of the passage openings, but by a larger amount than the cable clamping opening defined by the two levers.

16 Claims, 2 Drawing Sheets

(51) Int. Cl.
    *E05B 67/38*     (2006.01)
    *F16B 2/18*     (2006.01)

(56) References Cited

U.S. PATENT DOCUMENTS

| | | | | |
|---|---|---|---|---|
| 5,881,582 | A * | 3/1999 | Monaco | E05B 67/383 70/14 |
| D477,768 | S * | 7/2003 | Bridges | D8/333 |
| 7,264,293 | B2 * | 9/2007 | Fischer | B60N 2/01583 248/503.1 |
| 7,575,280 | B2 * | 8/2009 | Palomba | B60N 2/01583 296/65.03 |
| 7,703,828 | B2 * | 4/2010 | O'Connor | B60N 2/01583 296/65.01 |
| 7,926,858 | B2 * | 4/2011 | Otsuka | B60N 2/01583 292/216 |
| 7,959,205 | B2 * | 6/2011 | Paing | B60N 2/01583 296/65.03 |
| 8,128,135 | B2 * | 3/2012 | Maeta | B60N 2/01583 292/201 |
| 8,282,141 | B2 * | 10/2012 | Paing | B60N 2/01583 292/216 |
| 8,708,377 | B2 * | 4/2014 | Ishikawa | B60N 2/01583 292/216 |
| 8,950,810 | B2 * | 2/2015 | Dryburgh | B60N 2/01583 297/336 |
| 9,039,089 | B2 * | 5/2015 | Ohba | B60N 2/2352 297/335 |
| 9,050,911 | B2 * | 6/2015 | Wieclawski | B60N 2/2245 |
| 9,297,188 | B2 * | 3/2016 | Mensch | E05C 3/30 |
| 9,637,027 | B2 * | 5/2017 | Seigel | B60N 2/01583 |

OTHER PUBLICATIONS

Brady Wenn Leistung Wirklich Zahlt, www.brady.de, Technical Data Sheet "Prinzing economy cable lockout", Effective Date: Nov. 20, 2012.

\* cited by examiner

CABLE LOCKING SYSTEM

The present invention relates to a cable locking system, in particular for the locking of machines, units or plant for servicing, cleaning or maintenance, which comprises a cable and a cable clamp having a first lever having an at least substantially planar surface and having a second lever having an at least substantially planar surface and being connected to the first lever in an articulated manner such that the two levers can be moved between a release position in which they are angled with respect to one another and a clamping position in which their planar surfaces, in particular substantially their full surfaces, contact one another and together define an opening for clamping the cable, the clear opening surface of said opening decreasing with an increasing approach toward the clamped position, wherein the first lever is interspersed by a plurality of passage openings in a locking region which, in the clamped position, are aligned with corresponding passage openings by which the second lever is interspersed in a locking region and wherein the first lever has at least one angled section which rises from the planar surface of the first lever such that it clampingly engages around a marginal section of the second lever in the clamped position and which is spaced apart by a larger amount from the joint at which the two levers are connected to one another than the cable clamping opening defined by the two levers.

Such cable locking systems are generally known and serve in servicing, cleaning or maintenance of industrial plant and the like to prevent an unexpected switching on or starting up of units and machines in favor of occupational health and safety and accident prevention. This can take place by different measures of servicing security such as by marking switches or valves with warning signs, which is also known as so-called "tag out" or by blocking switches or valves by locks, which is also known as "lock out".

For example, cable locking systems of the initially named kind can be used as maintenance security as part of a lock-out measure, in particular for blocking valves, disconnectors, safety switches or the like in which a free end of the cable is, for example, led through a hand wheel of a valve and additionally around a fixed component and is subsequently led through a loop formed at the other end of the cable in order thus to form a cable noose closed in itself. To prevent the cable noose formed in this manner from being able to open again, the cable clamp is clamped onto the other end, the end to be secured, of the cable in that it is moved, starting from its release position or its open position, into its clamped position. In the clamped position, each person involved in the servicing can then hang a padlock into one of the passage openings in the locking region of the cable clamp and can close it before entering the danger zone. The locks are only removed again by the involved persons after the completion of the work so that it is ensured in this manner that the cable can only be released again and the block can accordingly only be canceled again when all persons have left the danger zone.

There is, however, a problem with known cable locking systems that the passage openings of the cable clamp can often only be accessed with comparative difficulty or are positioned at the respective lever such that the locks to be attached can only be attached to the cable clamp in a defined orientation with respect to the cable clamp.

In addition, known cable locking systems are frequently stiff and their operation is not intuitively clear to the user.

It is therefore the underlying object of the invention to further develop a cable locking system of the initially described kind such that its handling is improved, in particular with respect to the accessibility of the passage openings and with respect to the attachment of padlocks and such that it allows an easier, intuitive operation on the part of the user.

This object is satisfied in accordance with the invention by a cable locking system having the features of claim 1 and in particular in that the angled section of the first lever, which engages around a marginal section of the second lever in the clamped position, is spaced apart from the joint at which the two levers are connected to one another in an articulated manner by a smaller amount than each of the passage openings, but by a larger amount than the cable clamping opening defined by the two levers.

The respective locking region with its passage openings is therefore located at a free end of the respective lever so that at least those passage openings which are located directly adjacent to the free end of the respective lever are accessible easily and above all from different directions. The hoop of a padlock can thus be hung into such a passage opening both in a longitudinal orientation and in a transverse orientation to the longitudinal extent of the respective lever so that this passage opening can also be utilized for attaching a padlock when the lever is, for example, only accessible from its free end due to the spatial circumstances.

In this respect, in particular those locks which are hung into the passage openings formed directly at the free end of the respective lever can hang freely downwardly due to the position of the passage openings at the free end of the respective lever and are thus not impaired or are only impaired to a small degree by locks hung into other passage openings so that the accessibility of the padlocks per se is also improved. The locks consequently hang more freely, not necessarily divided at both sides and also do not mutually cover one another. They so-to-say form a semicircle which makes it possible for the involved workers to recognize fast and at a glance whose locks they are.

A further advantage due to the position of the locking regions at the free end of the respective lever comprises the fact that the levers of the cable clamp can thereby in particular be gripped more easily by the user in the closed position thereof. The user can thus namely pull apart or twist the levers at their free end slightly perpendicular to their planar surface in order thus to be able to grip each lever between the thumb and index finger for opening the clamp. If in contrast the angled sections are located at the free end of the levers, it is actually prevented by them that the user can grip the levers individually in the described manner between the thumb and index finger. The user must rather clamp both levers between the thumb and index finger to open such a clamp in order thus to be able to pivot the levers purely via friction between the thumb and the one lever and between the index finger and the other lever, which often proves to be problematic due to friction.

Furthermore, due to the position of the locking regions at the free end of the respective lever, the user is reminded of the design familiar to him of a classical safety hasp such as is known, for example, from U.S. Pat. No. 3,667,259, particularly since the cable clamp of the cable locking system in accordance with the invention can preferably likewise have a waisted region or section of reduced width as well as a rounded head section. The operation of the cable clamp thus becomes intuitively clear to the user who is faced with the cable locking system in accordance with the invention for the first time since he is already aware from the classical safety hasp how it is to be operated, in particular by gripping and opening the cable clamp in the region of the locking regions.

Advantageous embodiments of the invention will now be looked at in the following. Further embodiments result from the dependent claims, from the description of the Figures and from the drawings.

Provision is thus made in accordance with an embodiment that the two levers are of identical design. Only one type of lever thus has to be manufactured within the framework of the production, whereby the production costs can be reduced. In this case, the second lever also has an angled section which rises from the planar surface of the second lever such that it clampingly engages around a marginal region of the first lever in the clamped position. An abutment is thus provided together with the angled section of the first lever, by which abutment it can be avoided that a cable clamped in the cable clamping opening can be subjected to excessive shear strain.

In addition, the two levers are secured to one another perpendicular to their planar surfaces due to the two angled sections, whereby it can be ensured, in particular due to the fact that the angled sections are spaced apart by a smaller amount from the connection joint between the two levers than each of the passage openings, that the two levers do not deform perpendicular to the shear surface defined by the two planar surfaces. If namely the cable is clamped into the cable clamping opening defined by the two levers in the course of the clamping procedure, the cable experiences shear strain which is responsible for the cable being crushed under certain circumstances as part of the clamping process between the two levers, which has the consequence of their deformation perpendicular to their planar surface. Such a deformation of the two levers can be combated in the desired manner by the positioning of the angled sections close to the joint since the two levers are secured to one another by them perpendicular to the shear plane.

To further improve the accessibility of the passage openings for the attachment of padlocks to the cable clamp, the two levers can have a section with reduced width radially inwardly of the locking region so that in this case padlocks can also be hung into the passage openings directly adjacent to the section of reduced width in a transverse and longitudinal orientation as was already previously explained with respect to the passage openings directly adjacent to the free end of the levers.

In accordance with a preferred embodiment, the sections of reduced width can in this respect be formed by mutually oppositely disposed arcuate cut-outs, which in particular means that each of the two levers has an indentation along its two mutually oppositely disposed longitudinal sides, into which indentation the hoop of a padlock can be pivoted which is to be hung into a passage opening located directly adjacent to the cut-out.

Apart from this, it is also possible due to the fact that the section of reduced width is formed by cut-outs along the mutually oppositely disposed longitudinal sides of the respective lever that the planar surfaces of the two levers can contact one another substantially over a full area. No regions of the planar surfaces of the two levers are thus exposed on which contaminants which may make the opening of the cable clamp more difficult under certain circumstances can collect during service or cleaning work.

The two levers admittedly experience a certain material weakening in the section of reduced width, which is initially at the cost of the stiffness of the two levers in this region; however, to compensate this loss of stiffness, provision is made in accordance with a preferred embodiment that the angled section of the respective lever is located approximately where the width of the lever is reduced. In this respect, the angled section of the respective lever is preferably either spaced apart by a smaller amount from the joint at which the two levers are connected to one another in an articulated manner than the section of reduced width, but by a larger amount than the cable clamping opening defined by the two levers or it is located at least partly in the section of reduced width. If the cable clamp is therefore subjected to bending strain in the section of reduced width, the cable clamp behaves substantially as a rigid multilayer plate with respect to the cable clamping opening to be secured since the two levers are clamped to one another in the region of their angled sections so that shear stress as a result of bending between the two levers can at least be transmitted to a certain extent.

It is furthermore preferred if the two levers each have a head section at their end at which they are connected to one another in an articulated manner, the head section being rounded in circular form over an angular range of more than 180°, in particular more than 200°, preferably more than 220°, and in particular approximately 240°. The intuitive operation of the cable clamp can therefore be reinforced due to the basing on the known design of a classical safety hasp.

The invention further relates to a cable clamp for a cable locking system, in particular for the locking of machines, units or plant for service, cleaning or maintenance, having a first lever with a planar surface and having a second lever with a planar surface which is connected to the first lever in an articulated manner such that the two levers can be moved between a release position in which they are angled toward one another and a clamping position in which their planar surfaces contact one another and together define an opening for clamping a cable whose clear opening area decreases on an increasing approach to the clamping position, wherein the first lever is interspersed by a plurality of passage openings in a locking region which, in the clamped position, are aligned with corresponding passage openings by which the second lever is interspersed in a locking region and wherein the first lever has at least one angled section which rises from the planar surface such that it clampingly engages around a marginal section of the second lever in the clamped position and is spaced apart by a smaller amount from the joint at which the two levers are connected to one another than each of the passage openings, but by a larger amount than the cable clamping opening defined by the two levers.

Advantageous embodiments of the cable clamp in accordance with the invention result in an analog manner from the further developments of the cable locking system in accordance with the invention.

Figure 2:
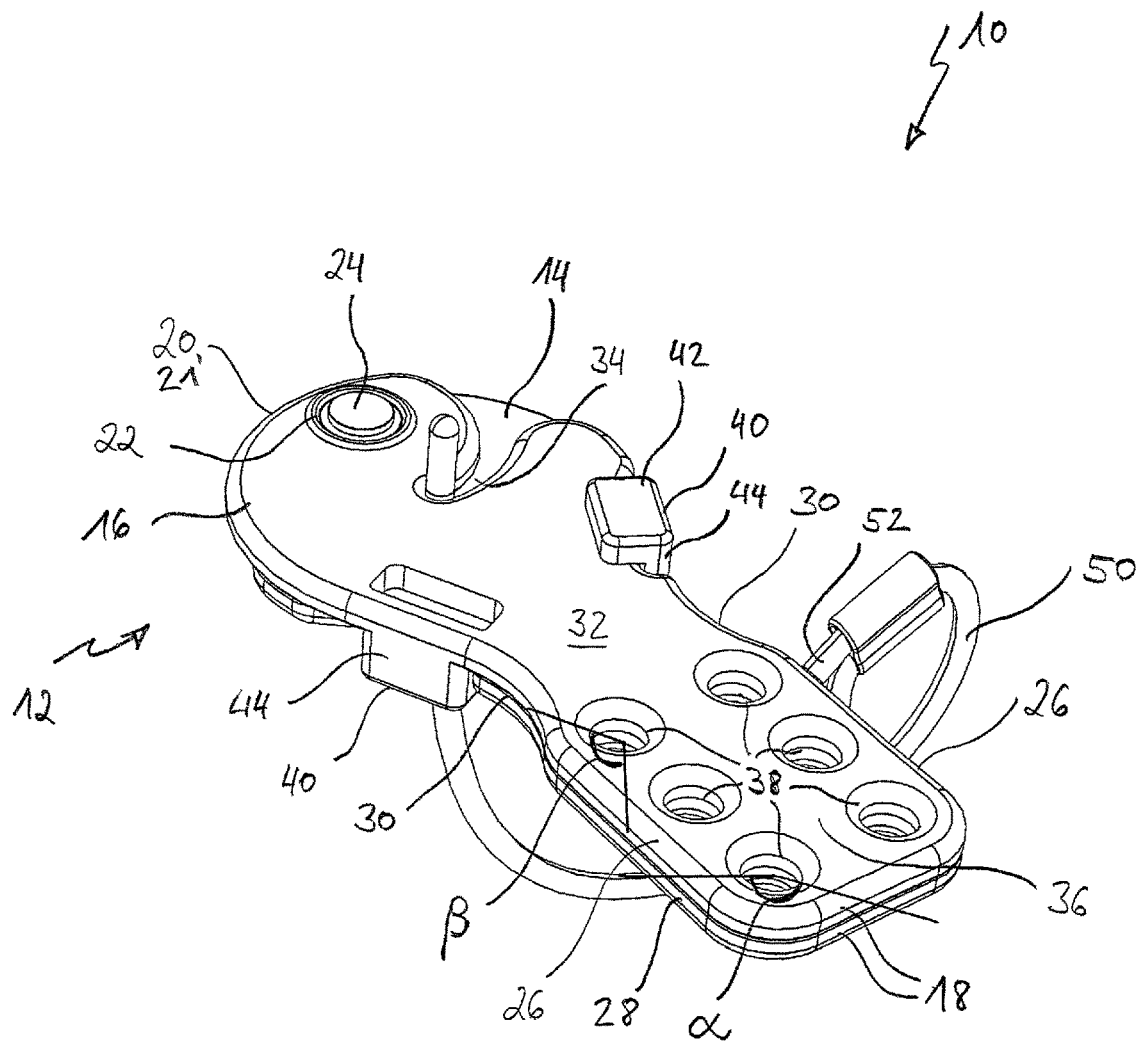

The invention will now be described in the following purely by way of example with reference to the drawings, in which:

FIG. 1 is a perspective representation of a lever of the cable clamp of the cable locking system in accordance with the invention; and FIG. 2 is a perspective representation of the cable locking system in accordance with the invention.

Since the cable clamp 12 in the embodiment of a cable locking system 10 shown in FIG. 2 is composed of two levers 14, 16 which are of substantially identical design and which are connected to one another in an articulated manner like the scissor linkage of a pair of scissors, only one of the two levers 14, 16 will initially be described in the following with reference to FIG. 1.

The lever 14 shown in FIG. 1, which is here also called the first lever 14, is manufactured from a plastic material, for example as an injection molded part, and has a plate-like, elongate design. In this respect, in the longitudinal direction, the lever 14 extends between a front end 18 and an end 20 disposed opposite the front end 18, where the two levers 14, 16 each have a head section 21 which is rounded in circle form over an angular region of more than 180°, preferably more than 220°, and in particular approximately 240°, and the lever has a joint opening 22, into which a pivot pin 24 is fitted, in the region thereof. The lever 14 is bounded transversely to the longitudinal direction by two mutually oppositely disposed longitudinal sides 26, 28 which each have a substantially arcuate cut-out 30 in a middle region so that the lever 14 has a section having a reduced width 32 in this region.

The lever 14 furthermore has an arcuate slit 34 adjacent to the joint opening 22, the slit serving as a cable jaw, partly circumscribing the pivot pin 24 and opening in the longitudinal side 28. The slit 34 in this respect serves for receiving a cable 50 which is to be clamped tight in the slit 34. At the oppositely disposed end, the cable 50 is configured with a loop 52 through which the end of the cable 50 to be clamped can be threaded before the clamping procedure in order thus to form a cable noose closed in itself in the desired manner which, for the securing of machines or the like, can be led around their valves or switches, as has already been previously explained.

In addition, the lever 14 has a locking region 36 which is located adjacent to the front end 18 of the lever 14 in the region of which the lever 14 is interspersed by here six passage openings 38 which are arranged symmetrically and of which here three are respectively arranged along the two longitudinal sides 26, 28 uniformly spaced apart from one another. The locking region 36 in this respect has a substantially rectangular design having rounded corners and has an aspect ratio which can vary from 1:2 to 1:1 depending on the number of passage openings 38 present. In the embodiment shown with two times three passage openings 38, the aspect ratio can, for example, amount to approximately 4:5, whereas in the case of two times four passage openings 38 the aspect ratio can amount to approximately 4:6, with the aspect ratio additionally being influenced by the diameter of the passage openings 38. In each case, however, the passage openings 38 are always provided pair-wise along the longitudinal sides 26, 28 so that the locking region can generally be designed as rectangular.

As can furthermore be seen from FIG. 1, the lever 14 furthermore has an angled section 40 which is located, viewed from the end 20 disposed opposite the front end 18, in front of the region of the section of reduced width 32 or extends into in it in part and rises along the longitudinal side 26 from the planar surface 17. The angled section 40 can, however, also be located in the section of reduced width 32. The angled section 40 in this respect has a flange section 42 which extends substantially in parallel with the planar surface 17 and which is connected to a web section 44 which extends perpendicular thereto and which in turn again extends perpendicular to the planar surface 17 of the lever 14 and merges as an integral component of the lever 14 into the longitudinal side 26. A reception region 46 whose function will be looked at in more detail in the following is thus provided by the angled section 40 and in particular by its flange and web sections 42, 44.

The cable locking system 10 in accordance with the invention will now be explained with reference to FIG. 2; it is here composed of two levers 14, 16 connected to one another in an articulated manner to form a cable clamp 12 and of a cable 50 which can be clamped tight in a cable clamping opening defined by the two levers 14, 16 together.

The second lever 16 which can be recognized in FIG. 2 is formed identically with the first lever 14, with it, however, being oriented such that the planar surface 17 of the second lever 16 faces the planar surface 17 of the first lever 14. The two levers 14, 16 are in this respect connected to one another in an articulated manner via the pivot pin 34 such that the two levers 14, 16 can be moved between a release position (not shown) in which they are angled toward one another and the clamped position shown in FIG. 2 in which their planar surfaces 17 contact one another at least substantially over their full area. In this respect, in the release position, the arcuate slit 34 of the first lever 14 continues in the arcuate slit 34 of the second lever 16, whereby a common opening for clamping the cable 50 is defined whose clear opening area decreases with an increasing approach to the clamping position. In the clamping position shown in FIG. 2, the clear opening area of the cable clamping opening which is defined by the arcuate slits 34 of the two levers 14, 16 is in this respect somewhat smaller than the cross-sectional area of the cable 50, whereby the cable 50 is reliably tightly clamped by the cable clamp 12.

To prevent the cable clamp 12 from being able to be opened without authorization and thus the cable 50 from being able to be removed during service and/or cleaning work, padlocks, not shown here, can be hung by the maintenance or cleaning staff into the mutually coinciding passage openings 38 not shown here so that the cable clamp 12 can only be opened again when all the locks have been removed again after the end of the work.

Since the passage openings 38 and in particular the passage openings 38 directly adjacent to the front end 18 are located at the free end of the levers 14, 16, a padlock can be hung into these passage openings 38 with its lock hoop in both a longitudinal orientation and a transverse orientation with respect to the longitudinal axis of the levers 14, 16 into the passage openings 38, as has been marked in FIG. 2 by the angle α. The angle α in this respect corresponds to approximately 120° so that a padlock can be easily hung into this passage opening 38 both in a transverse orientation and in a longitudinal orientation with respect to the longitudinal axis of the two levers 14, 16. If, for example due to tight space conditions, the longitudinal side 28 is not accessible, the passage opening 38 directly adjacent to the front end 18 can in this case nevertheless be used for attaching a padlock in that it is hung into the passage opening 38 starting from the front end 18. The same applies accordingly to the passage openings 38 directly adjacent to the section with reduced width 32 since these passage openings 38 are accessible over an enlarged angular range of approximately 110° through the arcuate cut-outs 30, as has been marked in FIG. 2 by the angle β.

The cable clamp 12 is admittedly weakened in this region due to the arcuate cut-outs 30 so that there is generally the risk that the cable 50 is crushed between the planar surfaces 17 of the two levers 14, 16 during the clamping procedure. However, to prevent such a crushing of the cable 50, the angled sections 40 are arranged, viewed from the end 20 disposed opposite the front end 18, in front of the section of reduced width 32 or only extending partly into it, whereby it can be prevented that the two levers 14, 16 are pressed apart in the region between the joint opening 22 and the respective angled section 40. The longitudinal side 28 of the respective lever 14, 16 is thus namely clampingly gripped around by the angled section 40 of the respective other lever 16, 14 so that the two levers 14, 16 are secured to one another by the two angled sections 40 perpendicular to the planar surface 17 of the two levers 14, 16. The flange sections 42 of the angled sections 40 are in this respect in particular spaced apart from the respective planar surface 17 by an amount which is somewhat smaller than the thickness of the levers 14, 16. When the marginal regions of the levers 14, 16 are pivoted into the reception regions 46, the levers 14, 16 are therefore clamped against one another. The clamping position can hereby be temporarily secured for the attachment of a first padlock without the two levers 14, 16 having to be manually secured for this purpose against an unwanted moving into their release position. This in particular proves to be advantageous when the cable clamp 12 is only accessible by one hand since in this case the cable clamp 12 can first be closed with one hand and a padlock can subsequently be hung with the other hand into one of the passage openings 38.

REFERENCE NUMERAL LIST 10 cable locking system
12 cable clamp
14 first lever of 12
16 second lever of 12
17 planar surface of 14, 16
18 front end of 14, 16
20 end opposite 17
21 head section
22 joint opening in 14, 16
24 pivot pin through 22
26 longitudinal side of 14, 16
28 longitudinal side of 14, 16
30 arcuate cut-out along 26, 28
32 section of reduced width of 14, 16
34 slit in 14, 16
36 locking region
38 passage opening
40 angled section of 14, 16
42 flange section of 40
44 web section of 40
46 reception region between 17 and 42
50 cable
52 loop of 50

The invention claimed is:

1. A cable locking system, which comprises a cable and a cable clamp, the cable clamp having a first lever with a planar first lever surface and a first arcuate slit formed in the first lever surface, and the cable clamp having a second lever which has a planar second lever surface and a second arcuate slit formed in the second lever surface, in which the second lever is connected to the first lever in an articulated manner by a pivot joint such that the first and second levers can be moved between a release position in which they are angled with respect to one another and a clamping position in which the planar first lever surface contacts the planar second lever surface and the first and second arcuate slits together define a cable clamping opening for clamping the cable, the cable clamping opening having a clear opening area that decreases with an increasing approach to the clamping position,
wherein the first lever is interspersed in a locking region by a plurality of passage openings which are aligned with corresponding passage openings in the second lever in the clamping position, by which the second lever is interspersed in a locking region and has at least one angled section which rises from the planar first lever surface such that it clampingly engages around a marginal section of the second lever in the clamping position and which is spaced apart from the joint at which the first and second levers are connected to one another by a smaller amount than all of the passage openings of the cable locking system, but by a larger amount than the cable clamping opening defined by the first and second levers, the at least one angled section located between the locking region and the pivot joint.

2. The cable locking system in accordance with claim 1, that is used for locking machines, units or plants, for servicing, cleaning or maintenance.

3. The cable locking system in accordance with claim 1, wherein the first and second levers are of identical design.

4. The cable locking system in accordance with claim 1, wherein the respective locking region is formed at a free end of the respective first or second lever.

5. The cable locking system in accordance with claim 1, wherein the first and second levers have a section with a reduced width radially inwardly of the locking region.

6. The cable locking system in accordance with claim 5, wherein the section of reduced width is formed by mutually oppositely disposed arcuate cut-outs.

7. The cable locking system in accordance with claim 5, wherein the angled section is located at least partly in the region of the section of reduced width.

8. The cable locking system in accordance with claim 5, wherein the angled section of the respective first and second lever is spaced apart from the joint at which the first and second levers are connected to one another in an articulated manner by a smaller amount than the section of reduced width, but by a larger amount than the cable clamping opening defined by the first and second levers.

9. The cable locking system in accordance with claim 5, wherein the respective locking region has a rectangular design.

10. The cable locking system in accordance with claim 9, wherein the respective locking region has a rectangular design having rounded corners.

11. The cable locking system in accordance with claim 1, wherein the first and second levers each have a head section at their end at which they are connected to one another in an articulated manner, the head section being rounded in circular form over an angular range of more than 180°.

12. The cable locking system in accordance with claim 1, wherein the first and second levers each have a head section at their end at which they are connected to one another in an articulated manner, the head section being rounded in circular form over an angular range of more than 200°.

13. The cable locking system in accordance with claim 1, wherein the first and second levers each have a head section at their end at which they are connected to one another in an articulated manner, the head section being rounded in circular form over an angular range of more than 220°.

14. The cable locking system in accordance with claim 1, wherein the first and second levers each have a head section at their end at which they are connected to one another in an articulated manner, the head section being rounded in circular form over an angular range of approximately 240°.

15. A cable clamp for a cable locking system, the cable clamp having a first lever with a planar first lever surface and a first arcuate slit formed in the first lever surface, and the cable clamp having a second lever which has a planar second lever surface and a second arcuate slit formed in the second lever surface, in which the second lever is connected to the first lever in an articulated manner by a pivot joint such that the first and second levers can be moved between a release position in which they are angled with respect to one another and a clamping position in which the planar first and second lever surfaces contact one another and the first and second arcuate slits together define a cable clamping opening for clamping a cable, the cable clamping opening having a clear opening area that decreases with an increasing approach to the clamping position, wherein the first lever is interspersed in a locking region by a plurality of passage openings which are aligned with corresponding passage openings in the second lever in the clamping position, by which the second lever is interspersed in a locking region and has at least one angled section which rises from the planar first lever surface such that it clampingly engages around a marginal section of the second lever in the clamping position and which is spaced apart from the joint at which the first and second levers are connected to one another by a smaller amount than all of the passage openings of the cable clamp, but by a larger amount than the cable clamping opening defined by the first and second levers, the at least one angled section located between the locking region and the pivot joint.

16. The cable clamp in accordance with claim 15, that is used for locking machines, units or plants, for servicing, cleaning or maintenance.

* * * * *